United States Patent
Lancaster et al.

(10) Patent No.: US 9,468,165 B2
(45) Date of Patent: Oct. 18, 2016

(54) IRRIGATION DEVICE

(71) Applicants: Christine Lancaster, O'Fallon, MO (US); Tammy Donnelly, Wentzville, MO (US); William Hiner, O'Fallon, MO (US); John Cain, Dardenne Prairie, MO (US); Katherine Hintze, Troy, MO (US); Allison Rezabek, O'Fallon, MO (US)

(72) Inventors: Christine Lancaster, O'Fallon, MO (US); Tammy Donnelly, Wentzville, MO (US); William Hiner, O'Fallon, MO (US); John Cain, Dardenne Prairie, MO (US); Katherine Hintze, Troy, MO (US); Allison Rezabek, O'Fallon, MO (US)

(73) Assignee: THE PATENT STORE LLC, O'Fallon, MO (US)

( * ) Notice: Subject to any disclaimer, the term of this patent is extended or adjusted under 35 U.S.C. 154(b) by 0 days.

(21) Appl. No.: 13/999,971

(22) Filed: Apr. 10, 2014

(65) Prior Publication Data
US 2014/0366438 A1   Dec. 18, 2014

Related U.S. Application Data

(60) Provisional application No. 61/956,830, filed on Jun. 18, 2013.

(51) Int. Cl.
*A01G 29/00* (2006.01)
*A01G 27/00* (2006.01)

(52) U.S. Cl.
CPC .............. *A01G 27/006* (2013.01); *A01G 29/00* (2013.01)

(58) Field of Classification Search
CPC .... A01G 29/00; A01G 27/006; A01G 27/02; A01G 27/04; A01G 27/06; A01G 27/00
USPC ....... 47/48.5, 40.5, 59 R, 64, 59 S, 63, 32.4, 47/32.5, 32.6, 32.7, 32.8, 41.01, 41.1, 47/41.11–41.15
See application file for complete search history.

(56) References Cited

U.S. PATENT DOCUMENTS

| | | | | |
|---|---|---|---|---|
| 4,087,938 A  * | 5/1978 | Koch | ..................... | A01G 29/00 239/200 |
| 6,401,389 B1 * | 6/2002 | Mount | ................... | A01G 27/02 47/65.5 |
| 6,601,339 B1 * | 8/2003 | Parker | ................ | A01G 13/0281 47/48.5 |
| 6,691,460 B1 * | 2/2004 | Lee | ........................ | A01G 27/02 47/79 |
| 6,715,233 B2 * | 4/2004 | Lyon | ...................... | A01G 27/02 47/79 |
| 6,901,698 B2 * | 6/2005 | Manning | ................ | A01G 25/02 138/139 |
| 2002/0032984 A1 * | 3/2002 | George | .................. | A01G 29/00 47/40.5 |
| 2002/0148158 A1 * | 10/2002 | Anderson | ............ | A01G 27/006 47/40.5 |
| 2006/0103131 A1 * | 5/2006 | Masarwa | ............... | A01G 25/02 285/125.1 |
| 2008/0276526 A1 * | 11/2008 | Tsai | ........................ | A01G 29/00 47/48.5 |
| 2011/0308152 A1 * | 12/2011 | Harley | .................. | A01G 25/00 47/48.5 |

* cited by examiner

*Primary Examiner* — Joshua Huson
(74) *Attorney, Agent, or Firm* — Jacobson & Johnson LLC (57) ABSTRACT

An irrigation device having a flexible container for holding water while delivering the water directly into the soil with the irrigation device having a filler neck to facilitate filling and inhibit backflow therethrough with a cap that can quickly seal the filler neck after the irrigation device is filled and a handhold useable to hold the filler neck in an elevated condition during the filling and closing of the flexible container.

10 Claims, 9 Drawing Sheets

IRRIGATION DEVICE

CROSS REFERENCE TO RELATED APPLICATIONS

This application claims priority from provisional application Ser. No. 61/956,830 filed Jun. 18, 2013.

STATEMENT REGARDING FEDERALLY SPONSORED RESEARCH OR DEVELOPMENT

None

REFERENCE TO A MICROFICHE APPENDIX

None

BACKGROUND OF THE INVENTION

This invention relates generally to portable irrigation devices for trees such as saplings or the like. Typically, the portable irrigation device is a drip irrigation device comprising a pliable or flexible bag for temporarily storing water with the flexible bag having small openings or ports on the bottom of the bag to permit water to slowly drip or seep into the soil beneath the container. The drip irrigation method being a preferred irrigation method since less water is lost through evaporation or runoff as the water is directly absorbed by the soil. One of the difficulties with portable drip irrigation devices is that the process of filling the flexible irrigation bag with water is awkward since the filler neck on the irrigation bag needs to be held in an elevated position in order for one to fill the irrigation bag with water. However, as irrigation bags are typically made from flexible materials it is oftentimes awkward or difficult for a person to hold the filler neck of the water bag in an elevated position. Typically, as water fills the water bag the weight of the water within the bag exerts a downward force on the bag, which may cause a person to lose their grip on the filler neck. In addition, once the storage bag is filled it is desirable to quickly close the inlet on the water bag to prevent water backflow through the filler neck.

SUMMARY OF THE INVENTION

An irrigation device comprising a flexible collapsible container for holding water while slowly delivering the water directly into the soil with the irrigation device having a filler neck to facilitate filling and an internal member to inhibit backflow therethrough. The device may include a cap that can quickly seal off the filler neck after the irrigation device is filled. A handhold attachment may be used to more easily support the filler neck in an elevated condition during the filling of the flexible container.

DESCRIPTION OF THE PREFERRED EMBODIMENT

Figure 1:
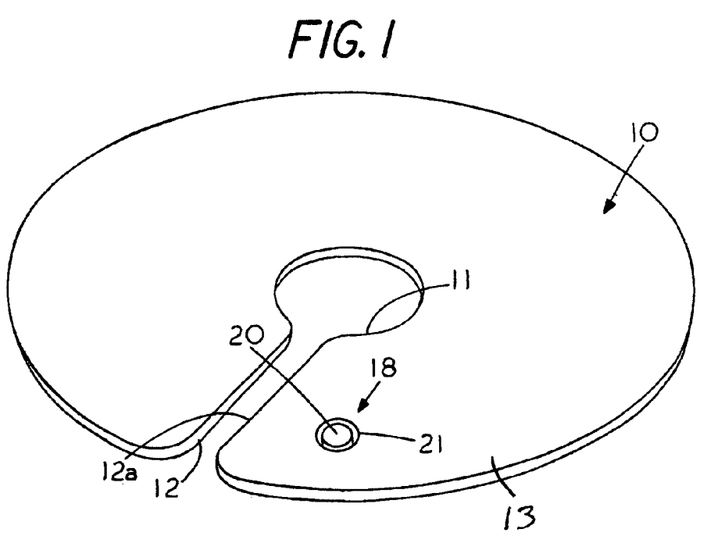
FIG. 1 is a perspective of an empty split soaker ring irrigation bag for placing around a sapling.

FIG. 1 is a perspective view showing a topside of a split soaker ring 10 in an empty or non-irrigating condition. Soaker ring 10 comprises a flexible container or bag 13 having an annular shape with a radial slot, which is formed by edge 12 and edge 12a. The slot permits one to place the central opening 11 around a sapling or the like. Typically, container 13, which contains an expandable compartment, may be formed from a flexible polymer plastic material such as PVC or polyethylene although other materials may be used. The flexible materials are lightweight and have the advantage of allowing the container to be folded and stored when not in use. In the example shown in FIG. 1 the soaker ring 10 contains a quick close filler neck cap or twist-on filler neck cap 20 that permits an operator to secure the filler neck cap 20 to a filler neck housing 18 with only a partial rotation of the filler neck cap.

While soaker rings are lightweight and flexible, which makes them easy to store and carry about, the flexibility oftentimes makes it difficult, if not awkward, to fill with water. In addition while the bag is full of water one must then place the cap on the soaker ring while minimizing or preventing water backflow through the filler neck. Unless one continually maintains the filler neck in an elevated condition water backflow occurs as a result of water pressure acting on the sides of the flexible container 13. Consequently, during the process of filling and closing the container one needs to use one hand to grasp and support a portion of the soaker ring or the filler neck in an elevated condition as well as when one secures the filler cap to the filler neck. If the filler neck and filler cap contain threads it is oftentimes difficult or time consuming to accurately align the threads on the cap with the threads on the filler neck since one needs to use both hands to support and align the filler neck housing with the filler cap. Typically, one initiates the process of attaching the filler cap to the filler neck by rotating the cap onto the filler neck with one hand while elevating the filler neck housing with the other hand. Since the filler neck housing is attached to a flexible container, which is full of water, the weight of the water in the bag generally makes it more difficult to grasp and maintain the filler neck housing in an elevated stable condition. In addition, since the soaker rings are used in outdoor environments any soil or debris on the threads of either the filler neck housing or the filler cap may make it difficult to engage the threads on the cap with the threads on the filler neck.

An alternate method of sealing a soaker ring is the use of a plug that is inserted into a filler neck of the soaker ring to prevent flow therethrough. While a plug may be easier to align than a threaded cap one also has to both elevate and support filler neck with one hand as the other hand is used to force the plug into frictional sealing engagement with the filler neck. The use of plugs requires additional support for the filler neck since the plug needs to be forced downward into the filler neck. Thus, with either type of closure the filling and closing of the flexible container 13 may not only be difficult and cumbersome it may also be a wet chore since any water backflow from the filler neck may spill onto the person attempting to secure the cap to the filler neck.

Figures 1A, 2:
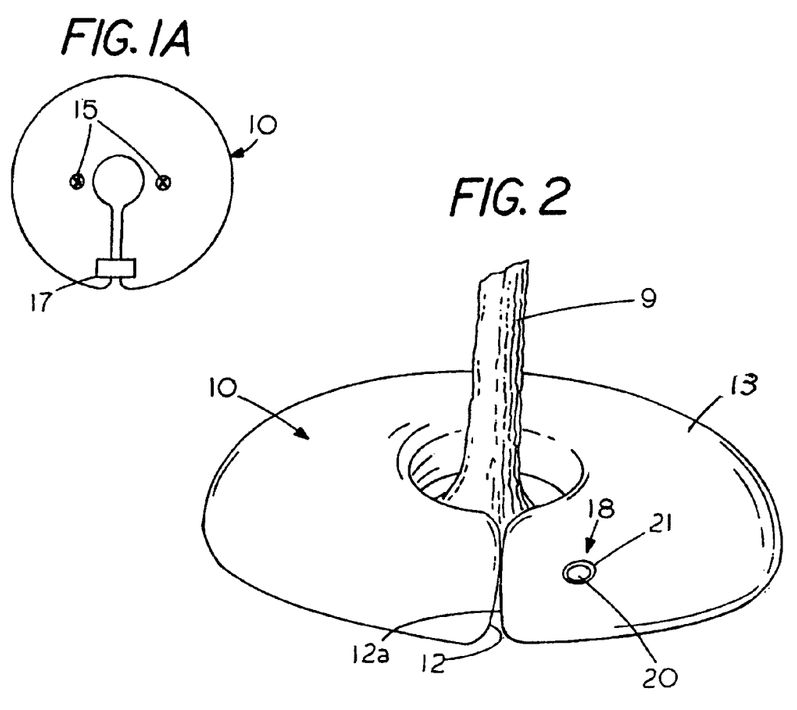
FIG. 1A is a bottom view of the split soaker ring of FIG. 1.
FIG. 2 shows the split soaker ring of FIG. 1 when filled with water with the soaker ring positioned around a sapling.

FIG. 1A is a bottom view showing the soil side of the soaker ring 10 of FIG. 1 revealing water ports 15, which in this application comprise small openings, that allow the water in the container 13 to slowly leak or seep out of the flexible container 13 and irrigate the soil beneath and around the soaker ring 10. Soaker ring 10 includes a connector 17 for holding a first end of the drip irrigation device proximate a second end of the drip irrigation device. Typically, connector 17 may be a flexible strip of material that fastens to the container 13 through a hook and pile strip such as a Velcro strip.

FIG. 2 shows the topside of soaker ring 10, which is filled with water, located around a sapling 9. In this example a radial slot, which is formed by end 12 and end 12a of the soaker ring 10, is used to place the soaker ring around the sapling.

Figure 3:
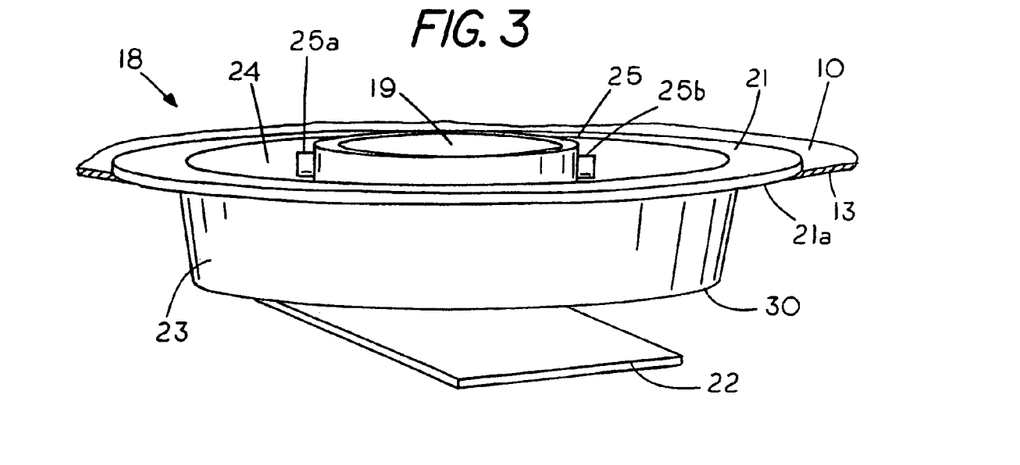
FIG. 3 is an isolated view of the filler neck housing.

FIG. 3 is an isolated perspective and cutaway view of a rigid cylindrical filler neck housing 18 that mounts to the flexible material, which forms the flexible container 13 of the soaker ring 10. Housing 18 includes an annular lip 21 having an underside 21a secured to container 13 in a watertight relationship. In the example of FIG. 3 the filler neck housing 18 includes a rigid outer wall 23 with a rigid cylindrical filler neck 25 that is concentrically spaced from wall 23 to provide an annular finger compartment 24 therebetween. Attached to a bottom 30 of rigid housing 18 is a resilient flap 22 that normally is maintained against the bottom 30 of housing 18 through the resiliency and stiffness of the flap 22. If water is directed into the opening 19 in the filler neck 25 the resilient flap 22 bends or flexes along a living hinge to allow water to enter the container. That is, the resilient flap 22 normally extends across an opening 19 in the filler neck 25 to prevent backflow therethrough while flexing inward to an open condition in response to directing water into the filler neck 25.

Figure 4:
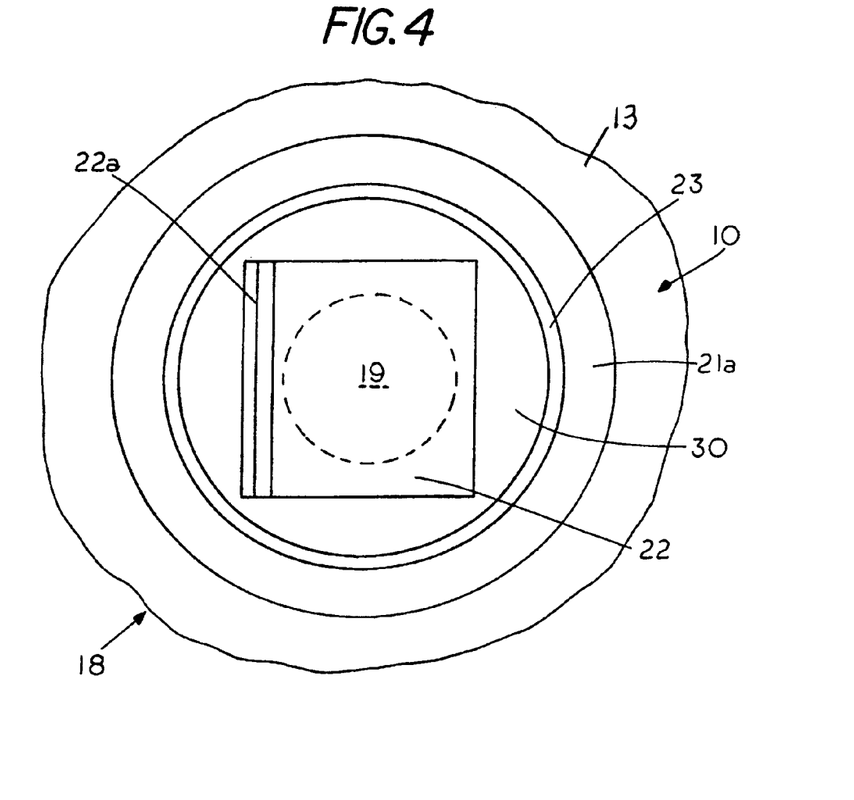
FIG. 4 is a bottom view of the filler neck housing of FIG. 3.

FIG. 4 shows a bottom view of the filler neck housing 18 revealing the resilient flap 22 extending across the opening 19 (dotted lines) in filler neck 25. In the example shown the resilient flap 22 is secured to bottom 30 of housing 18 through an adhesive or the like to provide a living hinge 22a that allows the flap 22 to be pivotally displaced to an open condition as water is directed into the opening 19 in the filler neck 25. Once the water to opening 19 is shut off the resiliency of the flap 22 causes the flap to close against surface 30 thus inhibiting or preventing backflow through the filler neck 26. FIG. 4 reveals that the flap 22 is sufficiently large so that when in the closed condition flap 22 completely covers the opening 19 in the filler neck 25.

Figure 5:
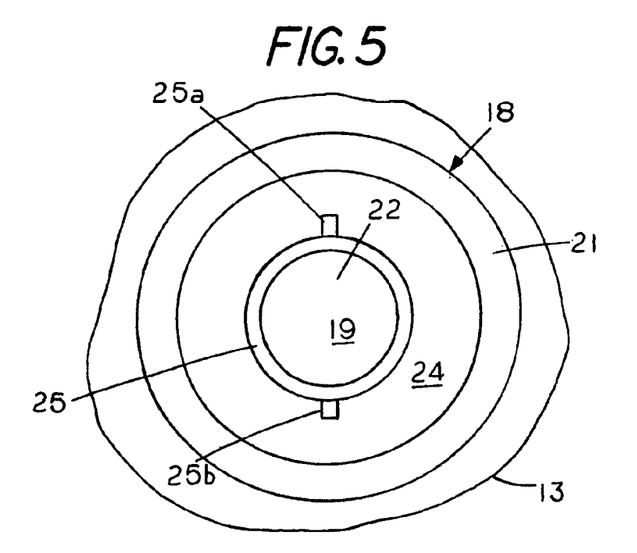
FIG. 5 is a top view of the filler neck housing of FIG. 3.

FIG. 5 is a top sectional view of the filler neck housing 18 of FIG. 3 with container 13 secured to the filler neck housing 18. The filler neck housing 18 contains an outer cylindrical wall 21 and an inner cylindrical filler neck 25 having an opening 19 for filling container 10 with water. In this example the filler neck—includes a set of diametrical cylindrical protrusions or cylindrical pegs 25a and 25b, which extend radially outward into a cylindrical finger compartment 24.

Figure 6:
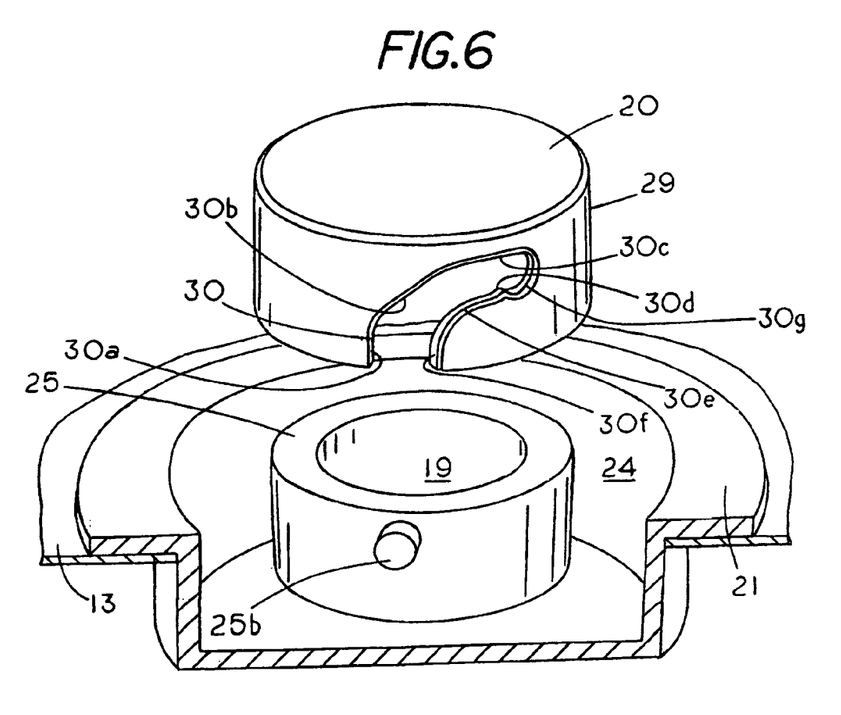
FIG. 6 is an exploded view of the filler neck housing and a twist-on cap.

A reference to FIG. 6 reveals the rigid cap 20 for quick sealing engagement with the filler neck 25. Cap 20 includes a cylindrical sidewall 29 having an elongated slot 30 extending therealong for engagement with cylindrical protrusion 25b on filler neck 25. An identical slot (not shown) is located on the opposite side for engagement with the cylindrical protrusion or peg 25a, which is located on the opposite side of the filler neck 25 (FIG. 5). Since both the slots are identical only one will be described. The slot 30 comprises a first side wall 30a and a second side wall 30f spaced therefrom which permit one to axially position the cap 20 on the filler neck 25 with the cylindrical protrusion 25b entering the slot opening between slot wall 30a and 30f and the cylindrical protrusion 25a (FIG. 5) entering the slot opening on the opposite side of the cap 20.

A second portion of the slot 30 comprises sidewalls 30e and 30b that angle toward a transversely extending slotted sidewalls 30c and 30g. The transverse extending slotted sidewall 30g and 30c are parallel to the top surface of the filler neck 25 so that rotation of cap 20 causes the cylindrical protrusion 25b and 25a to pull cap 20 axially downward into a closed condition where the cap 20 is in a water sealing engagement with a top surface of filler neck 25. A detent 30c extends upward from slotted wall 30g to form resistance to cap 20 accidentally rotating to an open condition once the cap has been rotated to the closed condition. Similarly, a detent (not shown) on the slotted sidewall on the opposite side of cap 20 also extends upward to resist accidentally opening of the cap 20.

Figure 7:
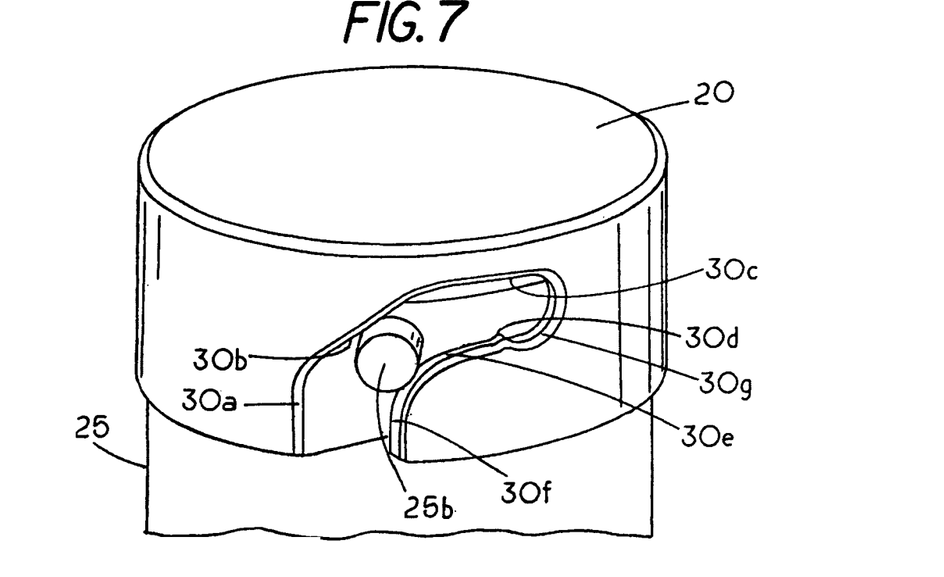
FIG. 7 is an isolated view of the cap and the filler neck housing during securement of the cap to the filler neck housing.
Figure 8:
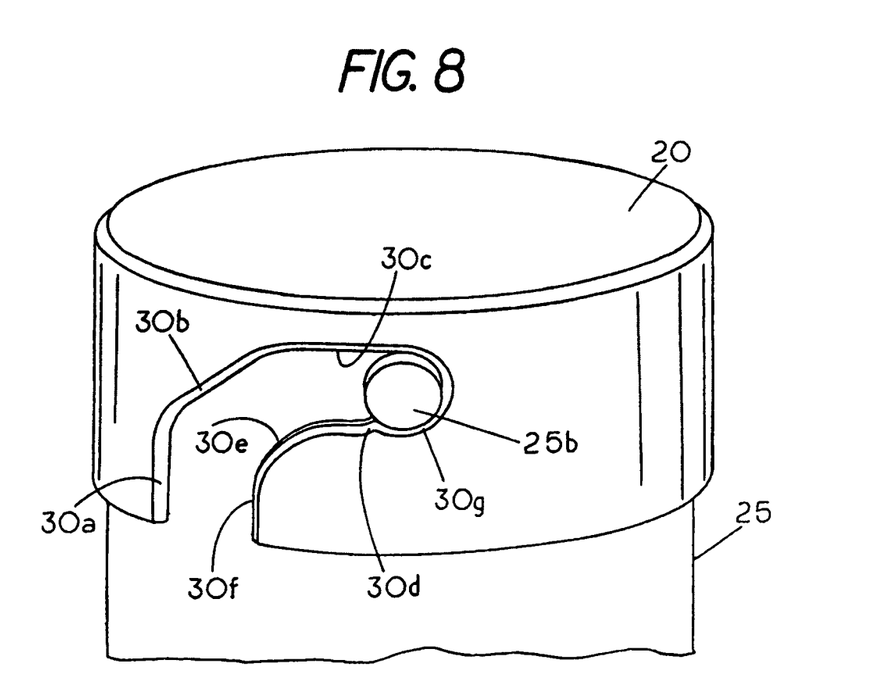
FIG. 8 is an isolated view of the cap and filler neck housing in the closed condition.

To illustrate the process of the quick attachment of cap 20 to the filler neck 25 reference should be made to FIG. 7 and FIG. 8 which show cap 20 in relation to the filler neck 25 as the filler cap 20 is secured to the filler neck 25. FIG. 7 reveals how the cylindrical portion 25b follows between the slot sides 30a and 30f to bring the cap 20 toward the filler neck. As one begins to rotate the cap 20 the slot walls 30b and 30e engage peg 25b. The continued rotation of cap 20 brings the cylindrical protrusions or peg 25b into engagement with slot sidewalls 30c and 30g and eventually into the position shown in FIG. 8, which is the closed condition that prevents backflow through the filler neck 25. As can be seen from FIG. 8 in less than a quarter turn the cap 20 is brought from an open condition to a closed condition.

A feature of the invention is that the filler neck 25 and cap 20 provide quick sealing engagement therebetween that allows for use of the cap 20 with or without the resilient flap 22. That is, since one can quickly attach the cap 20 to the filler neck with a partial rotation of the cap one may choose not to use the flap 22 since opportunities for backflow are reduced.

Figure 9:
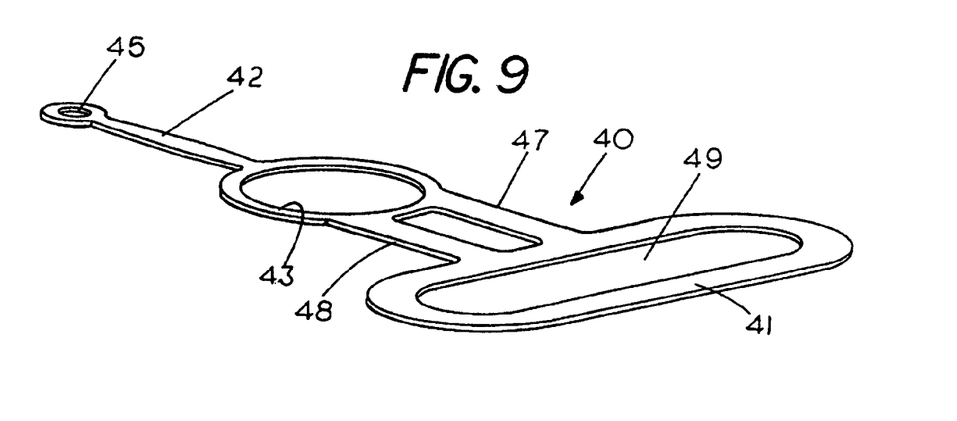
FIG. 9 is an isolated view of a handhold for attachment to the filler neck housing.

FIG. 9 shows a further feature comprising a flexible handhold 40 that attaches directly to the filler neck with the handhold 40 including a finger handle 41 that is attached to a central ring 43 by flexible members 47 and 48. With handhold 40 secured to the filler neck it permits a user to manually elevate the filler neck and the topside of the flexible container to thereby facilitate flow of water into the flexible container through the filler neck. Central ring maybe attached around the filler neck of a soaker ring through mechanical or frictional securement. Extending from the opposite side of ring 43 is a flexible link 42 that contains a ring 45 for rotational engaging with a pin on a cap. Thus, the cap 20 may be retained proximate to the filler neck through a flexible member having a one end secured to the cap and another end secured to the filler neck.

Figure 10:
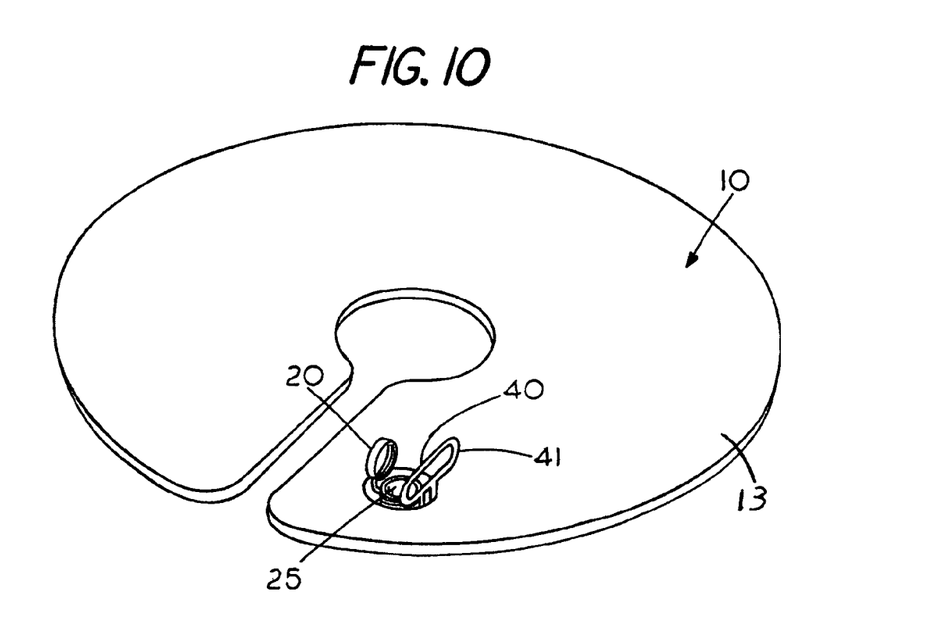
FIG. 10 shows the handhold of FIG. 9 mounted to a filler neck housing of a soaker ring.

FIG. 10 shows the handhold 40 mounted on a filler neck 25 with the finger handle 41 extending directly upward from the filler neck for ease in grasping. In this example the ring 45 (FIG. 9) attaches to cap 20 to maintain the cap proximate the soaker ring 10 during the filling of the soaker ring. The handhold 40, which is secured to the filler neck 25 has the advantage that it enables one to elevate and hold the filler neck 20 in an elevated condition without having to grasp either a portion of the filler neck or a portion of the flexible container 10. Thus, one can fill the flexible container 10 by directing water through the filler neck 25 while one uses the handhold 40 to hold the filler neck 25 in an elevated condition. The use of the handhold 40 provides for easier grasping and holding the container 10 in a filling position by eliminating the difficulty in using one hand to grasp an upward extending cylindrical filler neck while the other hand applies a cap to the filler neck. A further benefit is that handhold 40 directly elevates the filler neck rather than indirectly elevating the filler neck by grasping and elevating a portion of the flexible container.

Figure 11:
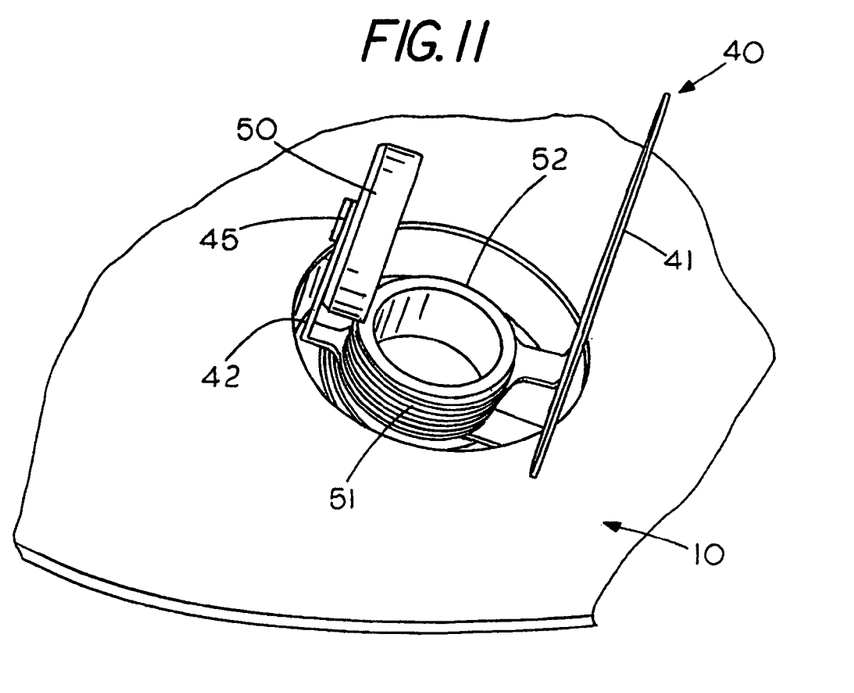
FIG. 11 shows a partial sectional view of the handhold of FIG. 9 mounted to a soaker ring having a threaded cap.

FIG. 11 reveals how the handhold 40 may be used with a soaker ring 10 having a threaded filler neck 52 with a set of male threads 51 for engaging female threads (not shown) on the inside of cap 50. In this example the handhold 40 performs a dual function in that the cap 50 is maintained proximate the filler neck 52 with cap 50 rotatable into engagement with threads 51 to prevent backflow through filler neck 52. In addition the handhold 40 allows one to elevate the filler neck 52 to prevent backflow through the filler neck as the cap 50 is rotated onto the filler neck.

Figure 12:
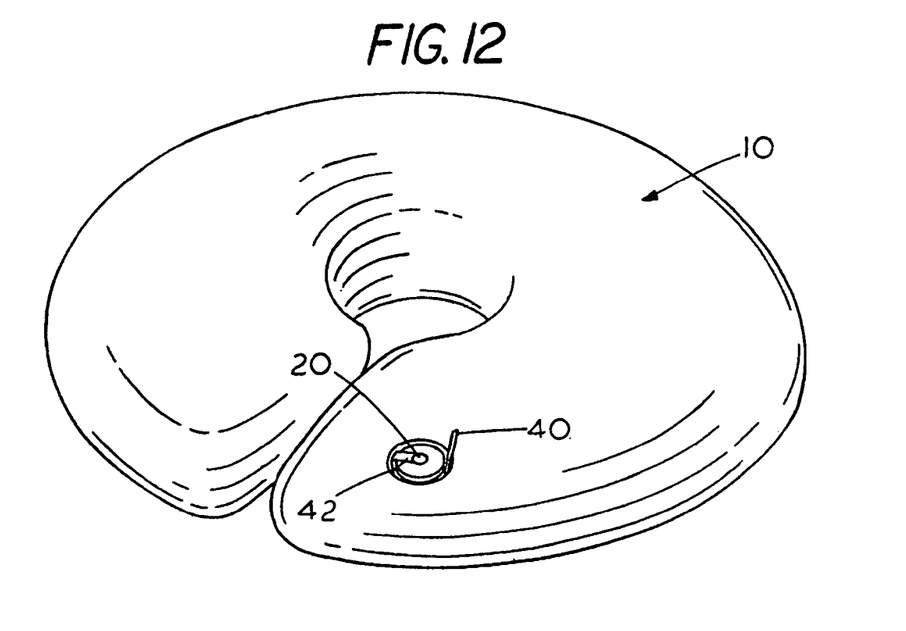
FIG. 12 shows a soaker ring with a handhold secured to the filler neck of a quick close filler neck cap.

FIG. 12 shows soaker ring 10 with the twist on cap 20 rather than the screw on cap 50 of FIG. 11. Soaker ring 10 is in a full or irrigating condition with the handhold 40 secured to the filler neck and the link 42 rotationally secured to the top of cap 20. A further benefit of handle 40 is that once the sapling has been irrigated the operator can quickly remove the soaker ring by grasping the handhold 40.

Figure 13:
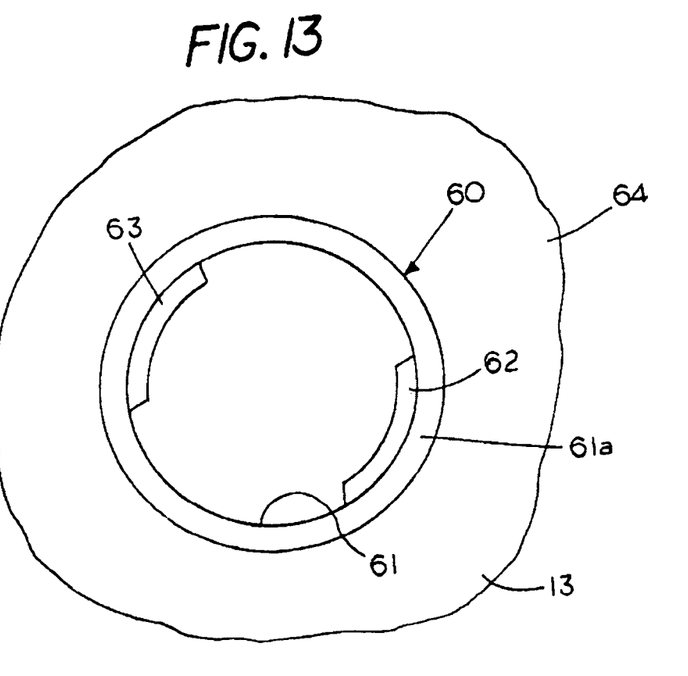
FIG. 13 shows a top view of an alternate embodiment of a filler neck housing with an internal lock.

FIG. 13 shows a top view of an alternate embodiment of a filler neck housing 60 attached to a container or bag 64 with the filler neck housing 60 having a first arcuate internal lock member 63 that extends along a portion of the cylindrical interior surface 61 and a second arcuate internal lock member 62 that extends along a further portion of the cylindrical surface 61. The cylindrical lock members 63 and 62, which are diagonally opposite from each other provide for quick coupling of a cap thereto since only a partial rotation of a cap enables one to seal the opening in the filler neck housing 60.

Figure 14:
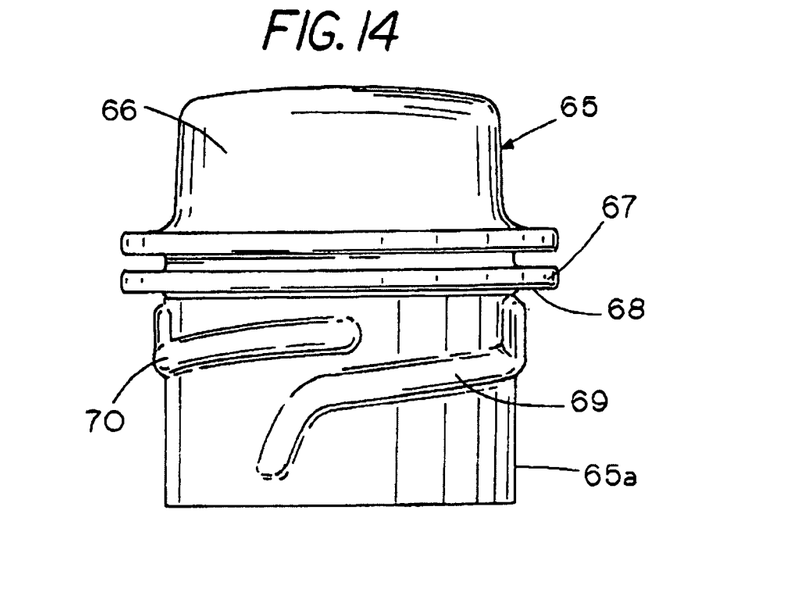
FIG. 14 shows the filler cap for engaging the filler neck housing of FIG. 13.

FIG. 14 shows an internally securable filler cap 65 having a domed head 66 with a cylindrical extension 65*a* having a first member 70 for engaging one of the internal lock members 63 or 62 and a second member 69 for engaging the other internal lock member 63 or 62 to enable a partial rotation of cap 65 to bring the annular sealing surface 68 of rim 67 into sealing engagement with annular top surface 61*a* on the filler neck housing of FIG. 13. Thus it will be appreciated that the embodiment of FIGS. 13 and 14 provides internal locking members for quickly securing a cap to a filler neck housing. Thus, both cap 65 or cap 20 comprise twist-on caps requiring less than one revolution to secure the cap to the housing, a useful feature when one must quickly secure the cap to the filler neck housing. The advantage of cap 65 is that it is less likely to become obstructed by soil or the like since the members for securing the cap are located on the inside of the filler neck housing.

Figure 15:
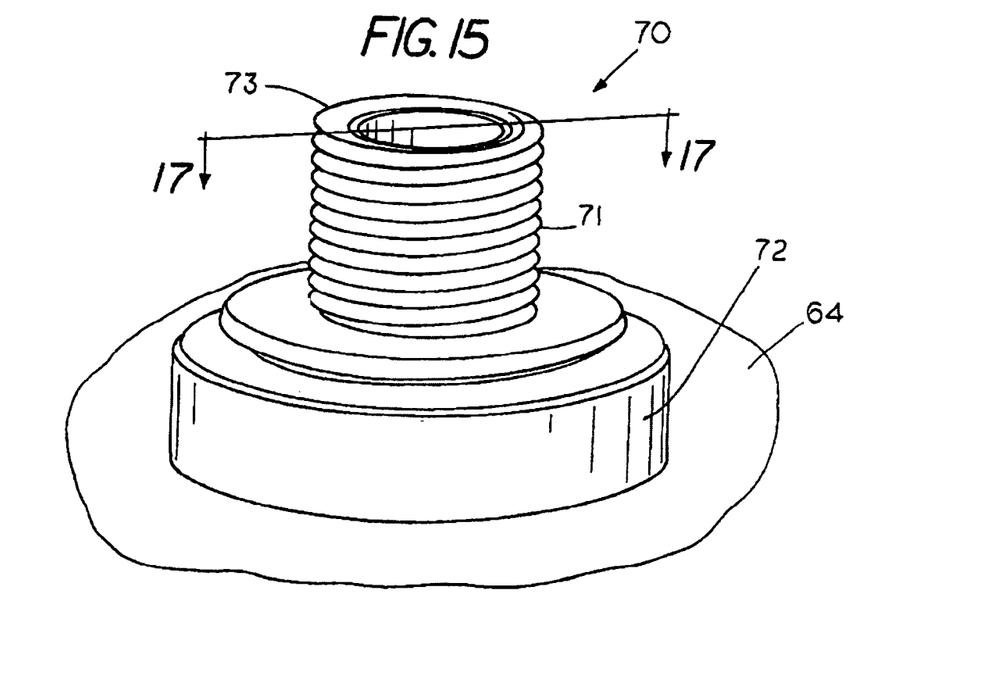
FIG. 15 shows a perspective view an alternate embodiment of a filler neck housing.

FIG. 15 shows a perspective view an alternate embodiment of a filler neck housing 70 with the filler neck housing having an annular top surface 73, a set of external male threads 71, an annular base 72 that connects to bag or container 64. In this example a cover (not shown) is rotated onto threads 71 to seal the opening in the filler neck housing.

Figure 16:
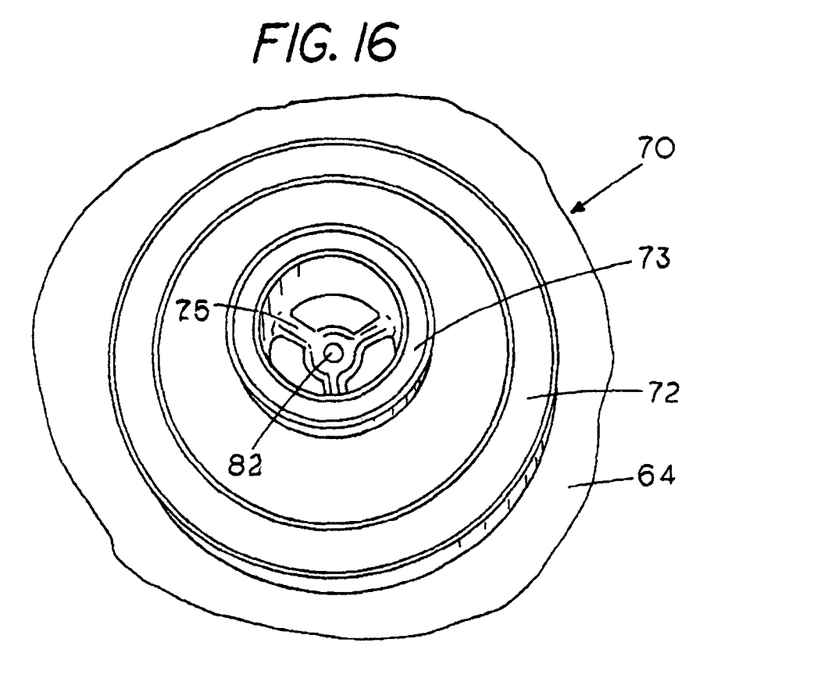
FIG. 16 shows a top view of the filler neck housing with an internal support for a one way valve.

FIG. 16 shows a top view of the filler neck housing 70 of FIG. 15 with an internal three-legged web support 75 that extends partially across the opening in the filler neck housing 70 to support a resilient one-way valve 82 therein.

Figure 17:
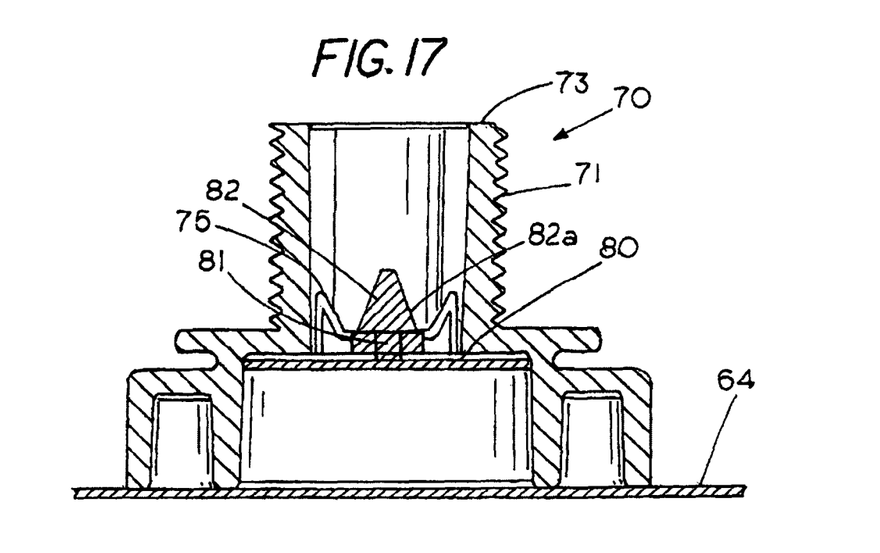
FIG. 17 shows a cross sectional view with a one way valve centrally supported in the filler neck housing of FIG. 16.

FIG. 17 shows a cross sectional view taken along lines 17-17 of FIG. 15 with a one-way valve 82 centrally supported in the filler neck housing 70 by the web support 75. The one-way valve 82 includes a head 82*a*, a central stem 81 and a resilient circular member 80 that normally extends across the opening in filler neck housing 70. The one way valve typically comprises a resilient material such as rubber or the like that is sufficiently flexible so as to bend inward away from support 75 to allow water directed into the filler neck housing 70 to flex the disk 80 which allows the water to flow into the container or bag 64. Once the water to the filler neck housing is shut off the resilient disk 80 returns to the condition shown in FIG. 17 thus preventing backflow from the container 64, which provides time for a cap to be secured to the external threads 71 of the filler neck housing 70.

As shown and described hereon one or all of the novel features may be used with a soaker ring to provide a soaker ring that is convenient to fill and close.

I claim:

1. An irrigation device for delivery of water directly to the soil around a tree comprising:

a one piece flexible container comprising a radial split annular pouch having an expandable compartment for temporarily storing water therein, said flexible container having a first end and a second end with a connector for holding the flexible container around the tree with the first end of the drip irrigation device proximate the second end of the drip irrigation device, said flexible container having a topside and a soil side with the soil side having at least one water irrigation port;

a rigid filler neck housing secured to the topside of said flexible container;

a rigid filler neck extending from said housing with said filler neck having an opening for filling the flexible container and a resilient flap located on the inside of the flexible container with said resilient flap normally extending across the opening in the filler neck to prevent backflow therethrough while flexing inward to an open condition in response to directing water into the filler neck, said filler neck including a set of radial protrusions extending radially outward from said filler neck; and a cap having a set of slot sides extending transverse to the axial direction of the cap for engagement with the set of radial protrusions to thereby axially restrain the cap on the radial protrusions as the cap is rotated into a closed condition on the filler neck through the engagement of the set of radial protrusions with the slot sides in the cap.

2. The irrigation device of claim 1 including a portion of the slot sides extending in an axial direction of the cap for placing the cap on the filler neck and a detent on the slot sides to inhibit accidental opening of the cap.

3. The irrigation device of claim 2 where the resilient flap is located on an underside of said housing with said resilient flap forming a living hinge with the resilient flap normally extending across the opening in the filler neck to prevent backflow therethrough while flexing inward to an open condition in response to directing water into the filler neck.

4. The irrigation device of claim 3 wherein the cap is retained proximate to the housing through a flexible member secured to the cap and to the housing.

5. The irrigation device of claim 4 wherein the handhold includes a handle to facilitate maintaining the housing in an elevated condition as water flows through the filler neck with a one end of the handhold secured to the filler neck housing.

6. The irrigation device of claim 1 including a handhold secured to said housing to permit a user to manually elevate the housing and the topside of the flexible container to thereby facilitate flow of water into the flexible container through the filler neck.

7. An irrigation device comprising:
a flexible radial split annular water bag with a single annular expandable compartment for holding water therein, said flexible water bag having a topside and a soil side with the soil side having an opening for slow release of water therethrough and a first end and a second end for connecting the first end and the second end to each other;
a filler neck housing secured to the topside of said bag with a filler neck extending from said filler neck housing with said filler neck having a fill hole therein;
a cap for rotationally engaging said filler neck;
with said filler neck including a set of diametrically opposite radial protrusions for engagement with said cap and said cap comprises a twist-on cap requiring less than one revolution to secure said cap to said filler neck housing with said filler neck housing including a one way valve located in said filler neck to prevent backflow therethrough, with the one way valve comprising a resilient circular member extending across an opening in the filler neck housing to inhibit backflow through the filler neck;
a flap located inside said flexible water bag and adhered to the inside of the housing with said flap including a living hinge allowing the flap to be displaceable inward to permit flowing water into the drip irrigation device and outward to block outflow of water when water is not flowing into the irrigation device; and
a handle secured to said filler neck housing for supporting the flexible water bag as water flows into the flexible water bag through the filler neck of the irrigation device.

8. The irrigation device of claim 7 wherein the twist-on cap includes a detent for resisting opening of the cap.

9. The method of drip irrigating comprising:
placing a flexible container around a sapling wherein said flexible container comprises a one piece flexible container having a radial split annular pouch with an expandable compartment for temporarily storing water therein, securing said flexible container having a first end and a second end with a connector for holding the flexible container around the tree with the first end of the drip irrigation device proximate the second end of the drip irrigation device, said flexible container having a topside and a soil side with the soil side having at least one water irrigation port; directing water into the container through a filler neck having an internal resilient flap displaceable inward in response to flowing water into the filler neck with the internal resilient flap retracting to a closed condition to block water from flowing from the container when water is no longer flowed into the filler neck;
holding the filler neck in an elevated condition during the filling of the flexible container with a handhold secured to the filler neck; and
sealing the filler neck by placing a twist-on cap on the filler neck and first engaging the cap with a set of radial pegs located on opposite side of the filler neck and then rotating the cap to secure the cap to the filler neck through engagement of the radial pegs with a set of slots on the twist-on cap, such that the step of twistingly engaging the set of radial pegs with set of slot sides on the twist-on cap with said internal resilient flap retarding water back flow out of the drip irrigation device before the cap is secured to the filler neck.

10. The method of claim 9 wherein the twist-on cap is turned less than a quarter turn to seal the cap to the filler neck.

* * * * *